A. J. White,
Scythe.
No. 35798
Patented July 1, 1862.
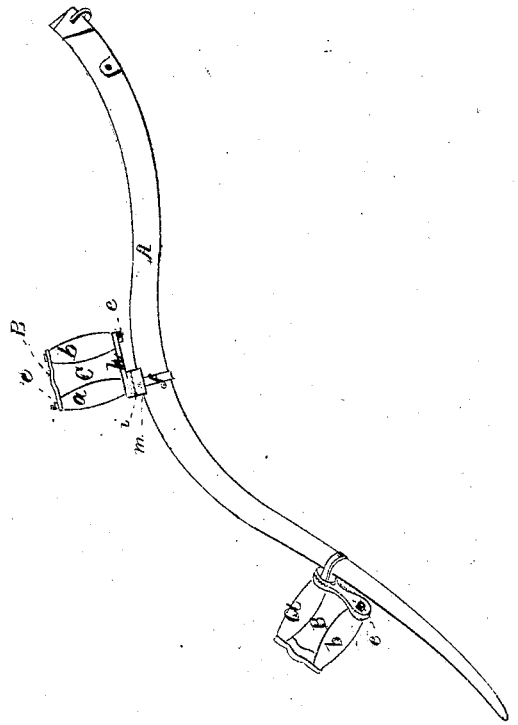
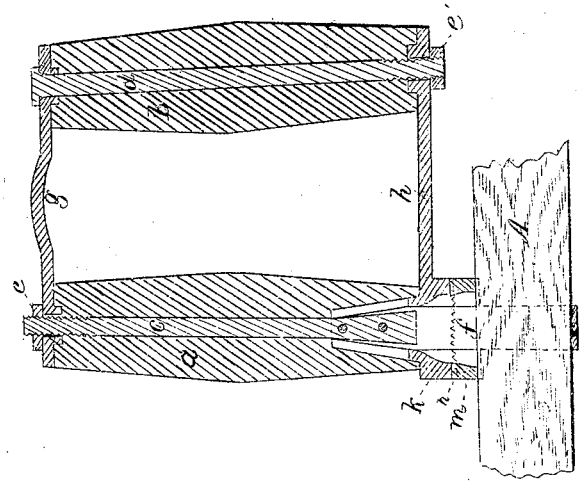
Fig. 2.

UNITED STATES PATENT OFFICE.

ADONIRAM J. WHITE, OF EAST FOXBOROUGH, MASSACHUSETTS.

IMPROVEMENT IN NIBS FOR SCYTHE-SNATHS.

Specification forming part of Letters Patent No. 35,798, dated July 1, 1862.

*To all whom it may concern:*

Be it known that I, ADONIRAM J. WHITE, of East Foxborough, in the county of Norfolk and State of Massachusetts, have invented an Improved Nib for Scythe-Snaths, of which the following is a full, clear, and exact description, reference being had to the accompanying drawings, making part of this specification, in which—

Figure 1 is a view of a snath with my improved nibs applied thereto; Fig. 2, a vertical section through the nib.

The nibs, which are attached to the snath, and which the mower grasps to swing the scythe, are usually adjusted on the snath at such distances (one from the blade and the other from the top of the stick) as will suit the fancy of the mower; but it is found in practice that these positions may be advantageously varied when cutting in different kinds of grass. For example, when mowing light grass the mower wishes to cut a wide swath, and to "reach in" as much as possible, or to cut along rapidly. For this he requires the nibs to be placed farther from the scythe than he does when cutting in heavy or lodged grass. As the quality of the mowing varies sometimes considerably even in the same field, (it being light on one side and heavy on the other,) it would not be practicable for the mower to stop and change the position of his nibs; but with the improved nib which is the subject of the present invention he may by merely changing his grasp obtain the required "reach" or swing of his scythe; and my invention further consists, in connection with this double nib, of a convenient means of adjusting the angle of the nib to the snath for the purpose of raising or lowering the edge of the scythe, which is also desirable, as the mower frequently wishes to change the "hang" of the scythe for different kinds of grass.

That others skilled in the art may understand and use my invention, I will proceed to describe the manner in which I have carried it out.

In the said drawings, A is the snath, to which are attached the upper nib, B, and the lower nib, C. These double or compound nibs consist each of two wooden handles, *a b*, placed on spindles *c d*, which pass longitudinally through them, and have nuts *e e'*, which screw onto the ends of the spindles and confine the handles. The spindle *c* has at its lower end a ring, *f*, which slips onto the snath, and is held firmly to it by drawing up the nut *e*. A metal brace, *g*, connects together the tops, and another brace, *h*, the bottoms of these handles, the spindles passing through holes in the ends of the braces. The lower brace, *h*, has on it at one end a ring, *k*, with notches and teeth *i*, which match another series of similar teeth, and notches in a ring, *m*, which is slipped onto the spindle *a* before the handle is put on, and which rests on and is forced down tight onto the snath by the nut *e*.

The following is the operation: The double or compound nibs B and C being attached to the snath at or about the usual position, and at such an incline to it as may suit the fancy of the mower, he has the convenience of changing his grasp to suit either light or heavy grass without stopping to move the nibs on the snath. For example, if the grass is light and he wishes to reach in, he grasps the handle *b* of the upper nib, B, and the handle *a* of the lower nib, C; and when a piece of heavy or lodged grass occurs he has merely to change his hold and grasp the handle *a* of the nib B and the handle *b* of the nib C, when his hands will be nearer his scythe and he will have more command of it. When he desires to change the incline of one of the handles *b* to the snath to effect the hang of the edge of the scythe—that is, to raise or lower the edge—it is only necessary to loosen the nut *e* and raise the teeth *i* of the ring *k* out of the notches of the ring *m* and turn the ring *k* a little in either direction, which changes the position of the handle *b* as required. These convenient adjustments, which enable the mower to change the hang of his scythe in the field, will be readily appreciated by those who have had to drag through a piece of heavy or tangled grass with a scythe which was hung too far from their hands.

If preferred, the adjustment by means of the toothed rings *k m* may be dispensed with, and the hang of the edge be regulated at the scythe-fastening; but this will generally be more tedious.

What I claim as my invention, and desire to secure by Letters Patent, is—

1. A double or compound nib consisting of the handles $a\ b$, connected by braces $g\ h$, substantially as described.

2. The toothed rings $k\ m$, in combination with the spindle $c$ for adjusting the position or incline of the handle $b$ to the snath, substantially as set forth.

ADONIRAM J. WHITE.

Witnesses:
HENRY M. WHITE,
CURTIS M. BROWN.